June 26, 1962     P. LECAT     3,040,382
DEVICE FOR PREPLASTICIZATION IN INJECTION PRESSES
Filed June 8, 1959
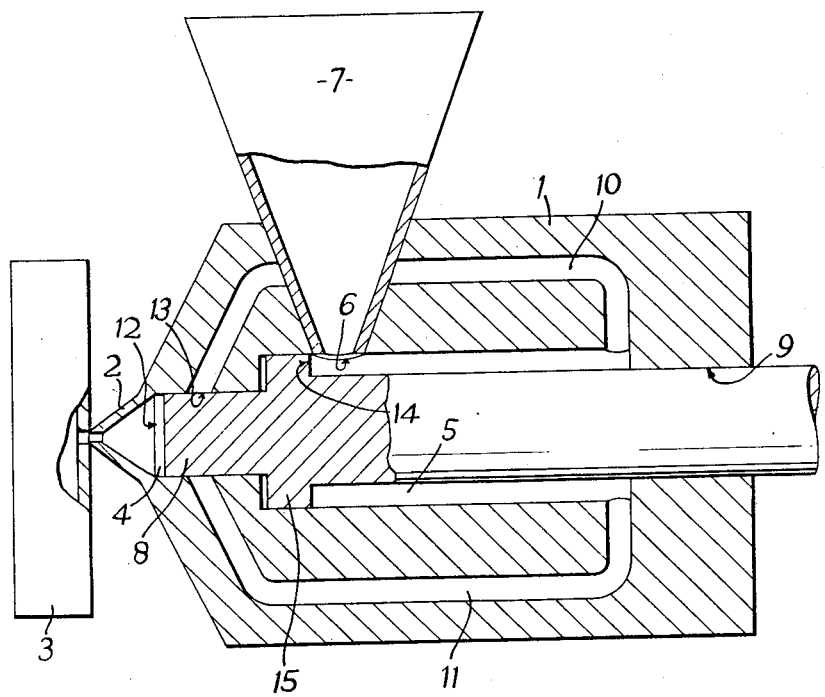
INVENTOR
PIERRE LECAT
BY
ATTORNEY

United States Patent Office 3,040,382
Patented June 26, 1962

3,040,382
DEVICE FOR PREPLASTICIZATION IN INJECTION PRESSES
Pierre Lecat, 5 Rue Bayard, Marseille, France
Filed June 8, 1959, Ser. No. 818,675
Claims priority, application France Oct. 8, 1958
1 Claim. (Cl. 18—30)

In injection presses intended for the processing of plastics, the quality of the product is a function of the speed and the pressure imparted to the plasticized substance. At present the pistons force the solid matter through an "injection cylinder" equipped with a heating device. The thrust therefore has to move the material and convey it into the plasticization ducts and thence into the mould. The path which it has to travel is long, the resistances opposing it increase, and the power consumed is considerable.

In the case of large presses, moreover, it was realised that the hot plasticized substance had to be conveyed direct into the cylinder. Distributor-heaters were than mounted on the "injection cylinder." The auxiliary apparatus, although improving the efficiency, increased the cost-price of the machine, at the same time rendering its operation more complicated.

The purpose of the present invention is to provide a device which, while simplifying the mechanism, enables the pre-heated plastic substance to be distributed in the injection-cylinder, so that the pressure of the piston can be utilised direct for the moulding process.

The accompanying drawing shows an embodiment of injection moulding machine in longitudinal section.

The injection cylinder 1 has an outlet 2 for connection to a mould 3. Within the cylinder 1 is an injection chamber 4 communicating with the outlet 2 and with one end of a cylinder bore 5.

A material inlet opening 6 in the cylinder opens intermediately along the cylinder bore 5, and a material hopper 7 has its outlet in the opening 6. An injection piston 8 is slidable within the injection chamber 4 for forcing material out of said chamber through the outlet 2 into the mould 3. The injection piston forms a sliding seal at 9 with the cylinder 1 at the other end of the cylinder bore 5. The cylinder 1 has therein passages 10, 11 forming a communication between a point of the cylinder bore 5 beyond the inlet opening 6, considered in the direction of return stroke of the piston, and a point intermediately along the length of the injection chamber 4, whereby during moving of the piston 8 in its injection stroke along the injection chamber 4 its leading edge 12 passes beyond the opening 13 of the passages 10, 11 so that the piston ejects the material from the injection chamber 4 during the remainder of its stroke. During the return stroke of the piston, the trailing edge 14 of the enlarged portion 15 of the piston passes beyond the material inlet opening 6 so that the piston, for the remainder of the return stroke, forces material from the cylinder bore 5 into and through the passages 10, 11 to the injection chamber 4, the openings 13 of which have then become open again by withdrawal of the piston 8.

The advantages of this device are numerous.

In the first place, it eliminates the necessity for the costly and cumbersome auxiliary apparatus required for feeding the second "injection cylinder." The return-movement of the piston is utilised for plasticizing the material to be injected. The pressure-loss, caused by the friction of the cold material on entering the vessel, is avoided.

Furthermore, since the driving-power of the piston is the same for the injection and for the return-movement, there is no increase in the energy expended, and above all, use is made of a movement and a stroke which were hitherto wasted.

Again, this so-called return-movement is in most cases longer than the injection-stroke, as the cooling of the mould, the extraction of the piece of plastic and the re-closing of the mould have to be awaited. It is precisely these "idle periods" which are utilised to render the direct distribution of the hot material automatic without any extra expense.

I claim:

In an injection moulding machine, an injection cylinder having an outlet for connection to a mould and an injection chamber communicating with the outlet and a cylinder bore communicating at one end with the injection chamber and a material inlet opening intermediately along the cylinder bore, a material hopper having its outlet in the inlet opening, an injection piston slidable within the injection chamber for forcing material out of the chamber through the outlet into the mould, said injection piston forming a sliding seal with the cylinder at the other end of the cylinder bore, the cylinder having therein passage means forming a communication between a point of the cylinder bore beyond the inlet opening considered in the direction of return stroke of the piston, and a point intermediately along the length of the injection chamber, whereby during movement of the piston in its injection stroke along the injection chamber its leading edge passes beyond the opening of the passage means so that the piston ejects material from the injection chamber during the remainder of its stroke, and whereby during return stroke of the piston its trailing edge passes beyond the material inlet opening so that the piston for the remainder of its return stroke forces material from the cylinder bore into and through the passage means to the injection chamber.

References Cited in the file of this patent
UNITED STATES PATENTS

| | | |
|---|---|---|
| 2,602,189 | Finelt | July 8, 1952 |
| 2,616,130 | Banz | Nov. 4, 1952 |
| 2,737,686 | Harkenrider | Mar. 13, 1956 |
| 2,834,051 | Rekettye | May 13, 1958 |